(12) United States Patent
Guillon et al.

(10) Patent No.: US 9,736,411 B2
(45) Date of Patent: Aug. 15, 2017

(54) IMAGE SENSOR PIXEL HAVING MULTIPLE SENSING NODE GAINS

(71) Applicant: Commissariat à l'Energie Atomique et aux Energies Alternatives, Paris (FR)

(72) Inventors: Marie Guillon, Fontanil-Cornillon (FR); Yvon Cazaux, Grenoble (FR); Josep Segura Puchades, Fontaine (FR)

(73) Assignee: Commissariat à l'Eneragie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 14/918,195

(22) Filed: Oct. 20, 2015

(65) Prior Publication Data
US 2016/0112662 A1    Apr. 21, 2016

(30) Foreign Application Priority Data

Oct. 21, 2014   (FR) ..................................... 14 60106

(51) Int. Cl.
H04N 3/14    (2006.01)
H04N 5/369   (2011.01)
(Continued)

(52) U.S. Cl.
CPC ......... *H04N 5/3698* (2013.01); *H04N 5/3559* (2013.01); *H04N 5/3741* (2013.01); *H04N 5/3742* (2013.01); *H04N 5/37452* (2013.01)

(58) Field of Classification Search
None
See application file for complete search history.

(56) References Cited

U.S. PATENT DOCUMENTS

2005/0224843 A1* 10/2005 Boemler .......... H01L 27/14603
                                                    257/233
2006/0261246 A1* 11/2006 Krymski .............. H04N 5/3653
                                                    250/208.1
(Continued)

FOREIGN PATENT DOCUMENTS

WO    2008027193 A2    3/2008
WO    2010097389 A1    9/2010

OTHER PUBLICATIONS

Preliminary Search Report filed in FR 14/60106 dated Aug. 3, 2015; 2 pages.
(Continued)

*Primary Examiner* — Twyler Haskins
*Assistant Examiner* — Wesley Chiu
(74) *Attorney, Agent, or Firm* — Moreno IP Law LLC

(57) ABSTRACT

The invention concerns an image sensor comprising: at least one pixel having a photodiode (PD); a sensing node (SN) coupled to the photodiode via a transfer gate (104); and a further node (AN) coupled to the sensing node (SN) via a first transistor (112); and a control circuit (120) adapted: to apply, during a reset operation of the voltage levels at the sensing node (SN) and further node (AN), a first voltage level (VDD) to a control node of the first transistor (112); and to apply, during a transfer operation of charge from the photodiode (PD) to the sensing node (SN), a second voltage level (VSK) to the control node of the first transistor (112), the second voltage level being lower than the first voltage level and higher than a ground voltage of the pixel.

16 Claims, 5 Drawing Sheets

(51) Int. Cl.
*H04N 5/374* (2011.01)
*H04N 5/355* (2011.01)
*H04N 5/3745* (2011.01)

(56) References Cited

U.S. PATENT DOCUMENTS

| | | | |
|---|---|---|---|
| 2007/0045681 A1* | 3/2007 | Mauritzson | H01L 27/14609 257/292 |
| 2007/0152292 A1* | 7/2007 | Toros | H01L 27/14603 257/463 |
| 2008/0074524 A1* | 3/2008 | Panicacci | H01L 27/14609 348/308 |
| 2008/0252742 A1* | 10/2008 | Oike | H04N 5/3741 348/222.1 |
| 2009/0200454 A1* | 8/2009 | Barbier | H04N 5/3559 250/214.1 |
| 2011/0085066 A1* | 4/2011 | Sugawa | H04N 5/378 348/302 |
| 2012/0188427 A1 | 7/2012 | Solhusvik | |
| 2012/0256077 A1* | 10/2012 | Yen | H01L 27/14609 250/208.1 |
| 2013/0033631 A1 | 2/2013 | Mabuchi | |
| 2014/0252201 A1* | 9/2014 | Li | H01L 27/14616 250/208.1 |
| 2014/0339397 A1* | 11/2014 | Nam | H04N 5/35581 250/208.1 |
| 2015/0062392 A1* | 3/2015 | Lenchenkov | H01L 31/02164 348/294 |
| 2015/0334323 A1* | 11/2015 | Egawa | H04N 5/378 348/300 |

OTHER PUBLICATIONS

"Fully Optimized Cu based process with dedicated cavity etch for 1.75 μm and 1.45 μm pixel pitch CMOS Image Sensors"; M. Cohen, et al; 4 pages.

ISSCC 2012/Session 22/Images Sensors/22.1; "An 83dB-Dynamic-Range Single-Exposure Global-Shutter CMOS Image Sensor with In-Pixel Dual Storage"; Masaki Sakakibara, et al; 2012 IEEE International Sold-State Circuits Conference; 3 pages.

"An89dB Dynamic Range CMOS Image Sensor with Dual Transfer Gate Pixel"; Xinyan Wang, et al.; Paper No. R36; 4 pages.

* cited by examiner

IMAGE SENSOR PIXEL HAVING MULTIPLE SENSING NODE GAINS

FIELD

The present disclosure relates to the field of image sensors, and in particular to an image sensor having pixels with pinned photodiodes and multiple sensing node gains.

BACKGROUND

CMOS image sensors generally comprise an array of pixels each having a pinned photodiode that accumulates charge during an integration period. The accumulated charge is then transferred to a sensing node of the pixel before being read. The sensitivity of such a circuit, as well as its dynamic range, is at least partially dependent on the size of the capacitance of the sensing node. Indeed, a relatively low capacitance level leads to a high sensitivity, but a low dynamic range. A relatively high capacitance level leads to a high dynamic range, but a low sensitivity.

It is a continuing challenge in the field of image sensors to provide pixels having both a high sensitivity and a high dynamic range, without greatly increasing the size or energy consumption of the image sensor.

SUMMARY

It is an aim of embodiments of the present disclosure to at least partially address one or more problems in the prior art.

According to one aspect, there is provided an image sensor comprising: at least one pixel having a photodiode; a sensing node coupled to the photodiode via a transfer gate; and a further node coupled to the sensing node via a first transistor; and a control circuit adapted: to apply, during a reset operation of the voltage levels at the sensing node and further node, a first voltage level to a control node of the first transistor; and to apply, during a transfer operation of charge from the photodiode to the sensing node, a second voltage level to the control node of the first transistor, the second voltage level being lower than the first voltage level and higher than a ground voltage of the pixel.

According to one embodiment, the control circuit is adapted to perform, after the transfer operation, a first read operation to generate a first value based on the voltage at the sensing node and a second read operation to generate a second value based on the voltage at the sensing node while applying the first voltage level to the control node of the first transistor.

According to one embodiment, the second voltage level is lower than VRT+$V_{TH}$ and higher than VPD+$V_{TH}$, where VRT is a reset voltage level applied to the sensing node and further node during the reset operation, VPD is a pinned voltage level of the photodiode and $V_{TH}$ is a threshold voltage level of the first transistor.

According to one embodiment, during the transfer operation the control circuit is further adapted to apply the first voltage level to a control node of the transfer gate.

According to one embodiment, the control circuit is further adapted: to perform, after the transfer operation, a first read operation to generate a first value based on the voltage at the sensing node; and to compare the first value with a threshold level.

According to one embodiment, the control circuit is further adapted to perform a second read operation to generate a second value based on the voltage at the sensing node while applying the first voltage level to the control node of the first transistor.

According to one embodiment, the image sensor further comprises an output block coupled to the sensing node via a read-out circuit of the pixel, wherein based on the comparison of the first value with the threshold level, the output block is arranged to either: generate a pixel value based on the first value; or generate a pixel value based on the second value.

According to one embodiment, the at least one pixel further comprises a reset transistor having one of its main current nodes connected to the further node and its other main current node coupled to a supply voltage rail.

According to one embodiment, the at least one pixel further comprises a reset transistor having one of its main current nodes connected to the sensing node and its other main current node coupled to a supply voltage rail.

According to one embodiment, the at least one pixel further comprises a second transfer gate coupled between the photodiode and a supply voltage rail.

According to one embodiment, the control circuit is adapted to control the second transfer gate of the at least one pixel to reset the photodiode to perform a global reset of the image sensor.

According to a further aspect, there is provided a method of operating at least one pixel of an image sensor, the at least one pixel having: a photodiode; a sensing node coupled to the photodiode via a transfer gate; and a further node coupled to the sensing node via a first transistor, the method comprising: applying, by a control circuit during a reset operation of the voltage levels at the sensing node and further node, a first voltage level to a control node of the first transistor; and applying, by the control circuit during a transfer operation of charge from the photodiode to the sensing node, a second voltage level to the control node of the first transistor, the second voltage level being lower than the first voltage level and higher than a ground voltage of the pixel.

According to one embodiment, the method further comprises: performing, after the transfer operation, a first read operation to generate a first value based on the voltage at the sensing node and a second read operation to generate a second value based on the voltage at the sensing node while applying the first voltage level to the control node of the first transistor.

According to one embodiment, the second voltage level is lower than VRT+$V_{TH}$ and higher than VPD+$V_{TH}$, where VRT is a reset voltage level applied to the sensing node and further node during the reset operation, VPD is the pinned voltage level of the photodiode and $V_{TH}$ is a threshold level of the first transistor.

According to one embodiment, the method further comprises applying, during the transfer operation, the second voltage level to the transfer gate.

According to one embodiment, the method further comprises: performing, after the transfer operation, a first read operation to generate a first value based on the voltage at the sensing node; and comparing the first value with a threshold level.

According to one embodiment, the method further comprises: a second read operation to generate a second value based on the voltage at the sensing node while applying the first voltage level to the control node of the first transistor; and based on the comparison of the first value with the threshold level, either: generating a pixel value based on the first value; or generating a pixel value based on the second value.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

Throughout the following description, the term "connected" is used to refer to a direct connection between one element and another, while the term "coupled" implies that the connection between the two elements may be direct, or via an intermediate element, such as a transistor, resistor or other component.

Figure 1:
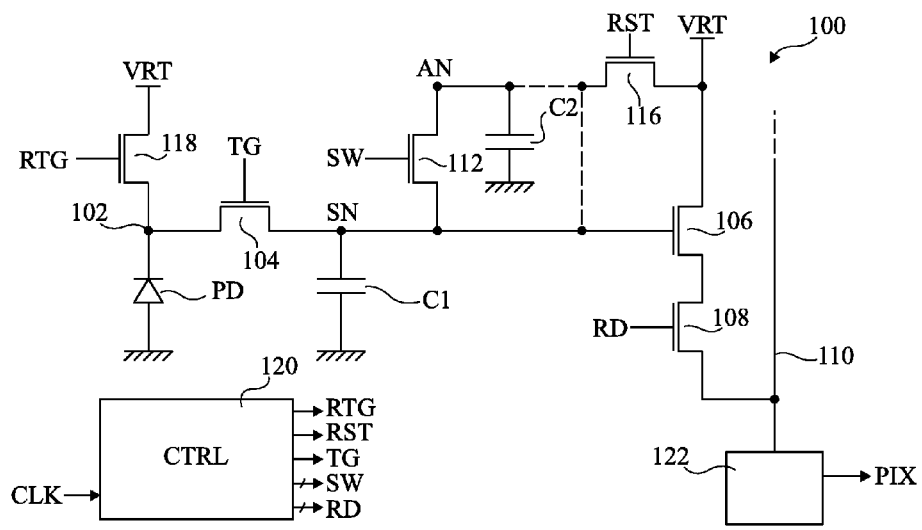
FIG. 1 schematically illustrates a pixel according to an embodiment of the present disclosure.

FIG. 1 schematically illustrates a pixel 100 of an image sensor according to an example embodiment. The pixel 100 is for example part of an array of a plurality of pixels arranged in rows and columns forming the image sensor.

The pixel 100 comprises a pinned photodiode PD. As known in the art, pinned photodiodes have their voltage pinned to a certain level, designated herein as VPD. For example, the photodiode is pinned to a voltage of around 1.5 V, and more generally to a voltage in the range 1 to 2 V.

The pinned photodiode PD is coupled between the ground voltage and a node 102. The node 102 is further coupled to a sensing node SN of the pixel via a transfer gate 104, which is for example controlled by a transfer gate signal TG. The sensing node SN has a capacitance $C_{SN}$, which for example results from only the parasitic capacitances of surrounding components, or may additionally result from the capacitance of a capacitor C1 optionally coupled between the sensing node SN and a ground or virtual ground voltage level. In some embodiments, the capacitance $C_{SN}$ is relatively low, for example of 10 fF or less.

The sensing node SN is further coupled to a read-out circuit of the pixel. In the example of FIG. 1, the read-out circuit comprises a transistor 106 coupled in a source-follower configuration, with its control node coupled to the sensing node SN, and its source coupled via a transistor 108 to an output column line 110 of the pixel. The transistor 106 for example has its drain coupled to a supply voltage VRT of the pixel. The transistor 108 is controlled by a read signal RD. In alternative embodiments, a different arrangement of the read-out circuit would be possible, for example with the read transistor 108 coupled between the drain of transistor 106 and the supply voltage VRT.

The pixel 100 further comprises an additional node AN. The additional node AN is coupled to the sensing node SN via the main conducting nodes of a transistor 112, which is for example an NMOS transistor, and has its control node coupled to receive a control signal SW. The additional node AN has a capacitance $C_{AN}$, which for example results from only the parasitic capacitances of surrounding components, or may additionally result from the capacitance of a capacitor C2 coupled between the additional node AN and the ground or virtual ground voltage level. The capacitance $C_{AN}$ is for example higher than the capacitance $C_{SN}$ of the sensing node SN, and is for example of 10 fF or more. The capacitance $C_{SN}$ is for example selected such that the combined capacitance $C_{SN}+C_{AN}$ can handle the maximum charge that may be transferred from the photodiode PD. In some embodiments the capacitance $C_{AN}$ is at least ten times greater than the capacitance $C_{SN}$.

The pixel 100 further comprises a transistor 116 coupled by its main conducting nodes between the pixel supply voltage VRT and either the additional node AN or the sensing node SN. The transistor 116 is for example an NMOS transistor controlled at its control node by a reset signal RST. The pixel 100 may also comprise a transfer gate 118 coupled between the node 102 and the supply voltage VRT of the pixel. The transfer gate 118 receives a signal RTG for resetting the voltage of the photodiode.

The signals TG, RD, SW, RST and RTG for controlling the transistors/gates 104, 108, 112, 116 and 118 of the pixel respectively are for example provided by a control circuit (CTRL) 120. The control circuit 120 is for example common for a group of pixels of the image sensor, such as one row of pixels. The control circuit 120 for example receives a timing signal CLK, and is for example implemented by an ASIC (application specific integrated circuit), although in alternative embodiments it could at least partially be implemented by a processor executing software instructions.

FIG. 1 also illustrates an output block 122 coupled to the column line 110 and for example associated with a column of pixels. The output block 122 for example comprises sample and hold circuits for sampling voltage levels read from the pixel 100, and also comprises circuitry for generating an output pixel value PIX based on the voltage levels read from the pixel as will be described in more detail below.

Operation of the pixel of FIG. 1 will now be described in more detail with reference to the flow diagram of FIG. 2.

Figure 2:
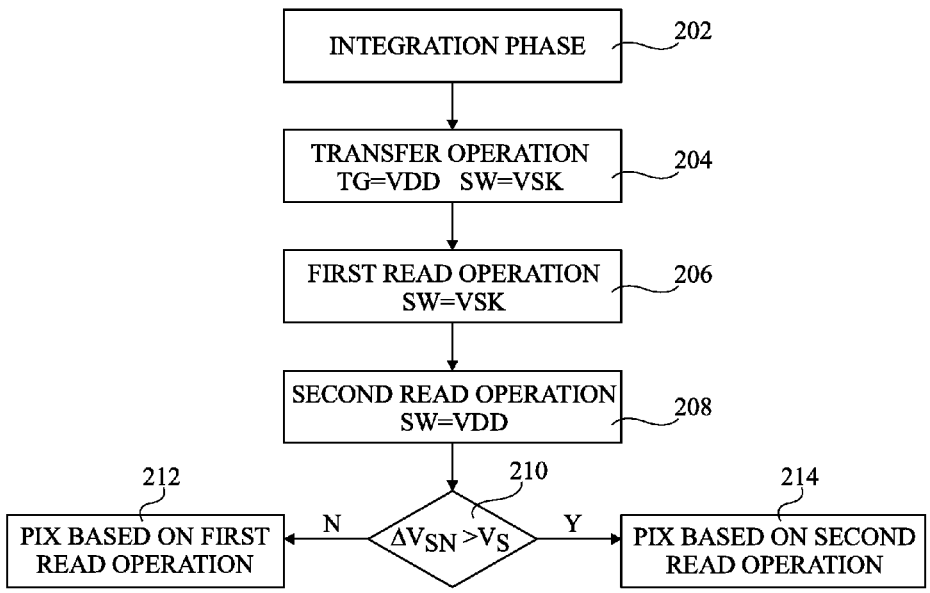
FIG. 2 is a flow diagram representing steps in a method of operating a pixel of an image sensor according to an embodiment of the present disclosure.

FIG. 2 illustrates operations performed by the pixel 100 and output block 122 of FIG. 1 under the control of the control circuit 120 during image capture and read-out. It is thus assumed that the circuit is powered, and that an image capture sequence has been triggered. For example, the image sensor is part of an image capturing device, such as a camera, mobile telephone or the like, and a user of the image capturing device has provided an input to cause an image or video to be captured.

In an operation 202, an integration phase of the photodiode occurs. The integration phase is for example initiated by resetting the voltage of the photodiode by asserting the signal RTG to activate transfer gate 118 and couple the photodiode to the supply voltage VRT. The voltage at the node 102 thus for example resets to the pinned voltage level VPD of the photodiode. In alternative embodiments, the transfer gate 118 could be omitted, and the photodiode could be reset via another channel, for example by activating the transfer gate 104, after having reset the voltage at the sensing node SN to the voltage VRT.

A subsequent operation 204 occurs at the end of the integration phase, and corresponds to a transfer operation. At some point before the transfer operation, a reset operation is performed to reset the voltage levels at the sensing node SN and at the additional node AN. During this reset operation, a voltage level, for example at VDD, is applied as the voltage signals SW and RST at the control nodes of transistors 112 and 116 respectively, to render these transistors conductive, allowing both of the nodes SN and AN to be reset.

During the transfer operation, the charge accumulated by the photodiode during the integration phase is transferred from the photodiode PD to the sensing node SN by activating the transfer gate 104. For example, a supply voltage level VDD is applied to the transfer gate 104. Throughout the transfer operation, the voltage signal SW at the control node of the transistor 112 is at an intermediate voltage level VSK, also referred to herein as a skimming voltage level, which is higher than the ground voltage of the pixel and lower than the supply voltage VDD. For example, the voltage VSK is higher than $VPD+V_{TH}$, where VPD is the pinned voltage level of the photodiode, and $V_{TH}$ is the threshold voltage of the transistor 112. The voltage level VSK is also for example at a level lower than $VRT+V_{TH}$, where VRT is the reset voltage level applied to the sensing node SN or to the additional node AN via the reset transistor 116. In other words, the level of VSK is for example set such that the transistor 112 will be conductive for a sub-range of the possible voltage levels of $V_{SN}$ following a transfer operation.

The effect of applying the intermediate voltage VSK to control node of transistor 112 is that, when the charge at the sensing node SN exceeds a certain level, it will overflow to the additional node AN. Indeed, the amount of negative charge transferred from the photodiode PD may cause the voltage at the sensing node SN to fall lower than the level VSK minus the threshold voltage $V_{TH}$ of the transistor 112, and thus some of the negative charge will be transferred or "skimmed" from the sensing node SN to the additional node AN until the voltage at the sensing node SN settles at a level of $VSK-V_{TH}$.

In a subsequent operation 206, a first read operation of the voltage $V_{SN}$ at the sensing node SN is performed, with the signal SW still at the level of VSK. If during the transfer operation no charge was skimmed from the sensing node SN to the additional node AN, the voltage $V_{SN}$ will be equal to at least $VSK-V_{TH}$. More precisely, the voltage $V_{SN}$ will equal $(VRT-V_{COUP}-Q/C_{SN})$, where $V_{COUP}$ is a coupling voltage drop across the transistor 112, Q is the charge transferred from the photodiode to the sensing node SN and $C_{SN}$ is the capacitance of the sensing node SN. Alternatively, if charge was transferred to the additional node AN during the transfer operation, the voltage $V_{SN}$ is clamped to a level equal to $VSK-V_{TH}$. A differential signal $\Delta V_{SN}$ is for example generated during the first read operation by subtracting the voltage $V_{SN}$ from a reset level $V_{RSN}$ read by the output block 122 while the signal SW is at the voltage level VSK, wherein $V_{RSN}$ is for example equal to $VRT-V_{COUP}$. In other words, $\Delta V_{SN}=V_{RSN}-V_{SN}$. Thus $\Delta V_{SN}$ is equal to $Q/C_{SN}$.

In a subsequent operation 208, a second read operation is performed to read a voltage level $V_{SN+AN}$ associated with the sensing node SN when connected to the additional node AN. In particular, the second read operation is performed with the control signal SW at a higher level than VSK, for example at the supply voltage level VDD. Thus the total charge transferred from the photodiode during the transfer operation is shared between the two nodes SN and AN, and the corresponding voltage at the sensing node SN is read. The voltage value will then be equal to $VRT-V_{COUP}-Q/(C_{SN}+C_{AN}+C_{SW})$, where $C_{SN}$ is the capacitance of the sensing node SN, $C_{AN}$ is the capacitance of the sensing node AN, and $C_{SW}$ is the parasitic capacitance introduced by the transistor 112. A differential signal $\Delta V_{SN+AN}$ is for example generated during the second read operation by subtracting the voltage $V_{SN+AN}$ from a reset level $V_{RSN+AN}$ read by the output block 122 while the signal SW is at the level higher than VSK, for example at the supply voltage level VDD. In other words, $\Delta V_{SN+AN}=V_{RSN+AN}-V_{SN+AN}$. This value will equal $Q/(C_{SN}+C_{AN}+C_{SW})$.

In a subsequent operation 210, the differential signal $\Delta V_{SN}$ based on the voltage $V_{SN}$ read from the sensing node SN during the first read operation is compared to a threshold level $V_S$. This operation is for example performed by the output block 122 of FIG. 1. Of course, it will be apparent to those skilled in that art that the voltage levels described herein in relation to the pixel, such as VRT, $V_{SN}$, $V_{RSN}$, $\Delta V_{SN}$ etc., are the pixel-related values, which are likely to be altered by a gain chain applied by the transistor 106 and the output block 122. The threshold level $V_S$ is for example chosen to correspond to a pixel-related value equal to or lower than $(VRT-V_{COUP})-(VSK-V_{TH})$, for example between 50 and 95 percent of $(VRT-V_{COUP})-(VSK-V_{TH})$, where VRT is reset level applied to the sensing node SN.

If in operation 210 the voltage $\Delta V_{SN}$ is determined to be lower than the threshold level $V_S$, the subsequent operation is 212, in which the output block 122 generates the output pixel value PIX based on the voltage level $\Delta V_{SN}$ read during the first read operation.

Alternatively, if in operation 210 the voltage $\Delta V_{SN}$ is determined to be higher than the threshold level $V_S$, the subsequent operation is 214, in which the output block 122 generates the output pixel value PIX based on the voltage level $\Delta V_{SN+AN}$ read during the second read operation. For example, the pixel value PIX is then determined as being equal to $G \cdot \Delta V_{SN+AN}$, where G is a gain. For example, the gain G is equal to $(C_{SN}+C_{AN}+C_{SW})/C_{SN}$, $C_{SN}$ and $C_{AN}$ being the capacitances at the nodes SN and AN respectively, and $C_{SW}$ being a capacitance associated with the transistor 112 while the signal SW is at the supply voltage level VDD. This value is equivalent to a full charge transfer to a capacitance of $C_{SN}$, and thus a high sensitivity is achieved with an extended dynamic range.

It will be apparent to those skilled in the art that the order of the operations of FIG. 2 could be changed. For example, in some embodiments, the second read operation 208 could be performed after the comparison operation 210. Furthermore, while in the example of FIG. 2 the second read operation is always performed, in alternative embodiments the second read operation could be performed only if during the comparison operation it is detected that the voltage level $\Delta V_{SN}$ is higher than $V_S$.

FIGS. 3A to 3E are diagrams representing the transfer of charge between nodes in the pixel of FIG. 1 during reset, integration and read phases according to an example embodiment. In particular, the diagrams each represent, from left to right, the pixel supply voltage level VRT, the control voltage RTG, the voltage of the photodiode PD, the control voltage TG, the voltage at the sensing node SN, the control voltage SW, the voltage at the additional node AN, and the control voltage RST. As illustrated, the voltage VRT is for example at a level lower than the supply voltage VDD, and the voltage level VPD at which the photodiode is pinned is for example at a level lower than the voltage VRT. For example, the supply voltage VDD is at a level of between 3.3 and 3.6 V, the supply voltage VRT is at a level of between 2.5 and 3 V, and the pinned level VPD of the photodiode is at between 1 and 1.6 V. The voltage level VRT for example corresponds to the voltage level VDD minus the MOS threshold voltage $V_{TH}$ of the transistor 112.

Figure 3A:
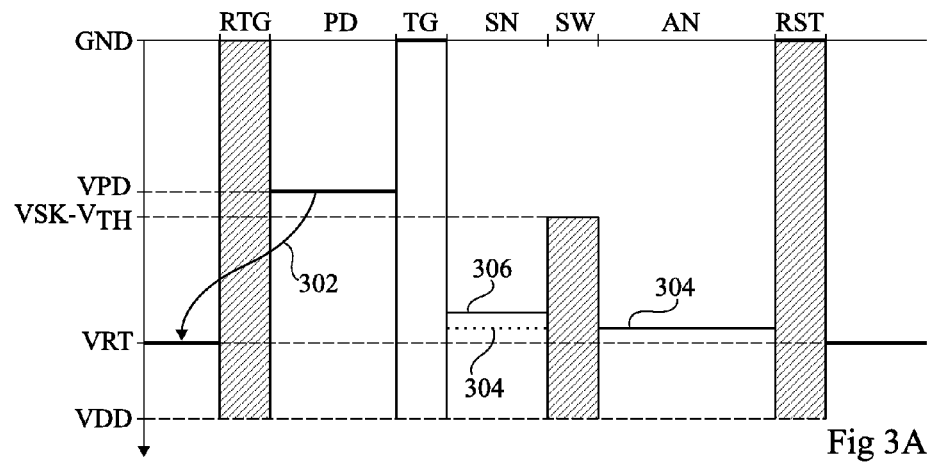
FIGS. 3A to 3E are diagrams representing the transfer of charge between nodes of the pixel of FIG. 1 during reset, transfer and read operations according to an example embodiment.

FIG. 3A represents a reset operation of the photodiode PD. In particular, the control signal RTG is for example asserted at the level of the supply voltage VDD, and any charge present on the photodiode is thus evacuated to the voltage rail VRT, as represented by an arrow 302.

FIG. 3A also represents a reset operation of the voltages at the sensing node SN and additional node AN. While represented in the same diagram as the resetting of the photodiode PD, the resetting of the sensing node SN and of the additional node AN for example occurs at a different time, such as at the end of a read operation of a previous pixel value, or just before the transfer operation if in a rolling shutter mode of operation. The control signals RST and SW are for example both asserted at the level of the supply voltage VDD, such that both of the nodes SN and AN are coupled to the supply voltage VRT, and settle at a voltage level represented by a line 304 in FIG. 3A, which is slightly lower than the level VRT due to the coupling voltage drop across transistor 116. The signal SW is then reduced to the level VSK or to ground, causing the voltage at the sensing node SN to drop, due to the coupling voltage drop across the transistor 112, to a level shown by a line 306 in FIG. 3A.

Figure 3B:
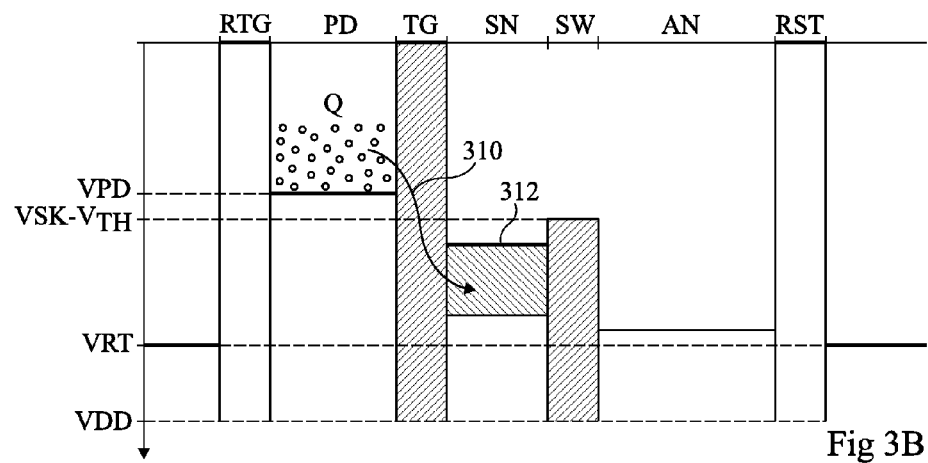
Figure 3C:
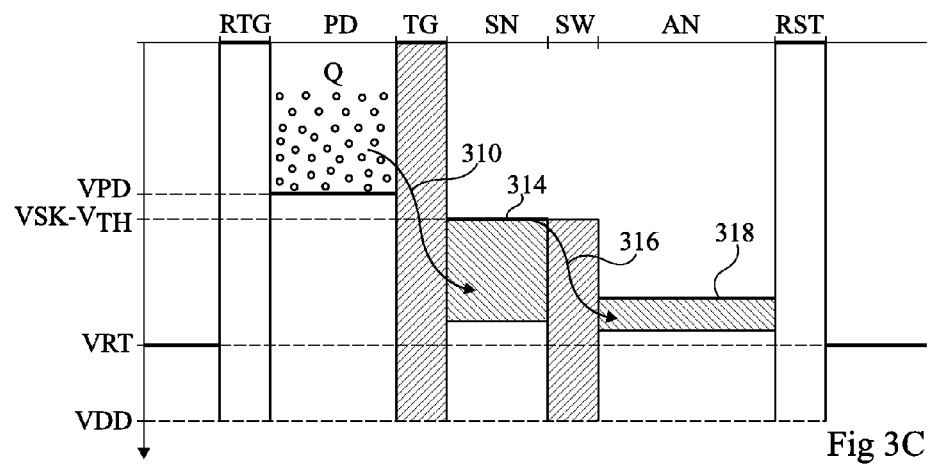

FIGS. 3B and 3C both represent a transfer operation performed at the end of the integration period. FIG. 3B represents the case in which no charge is transferred to the additional node AN during the transfer operation, while FIG. 3C represents the case in which some charge is transferred to the additional node AN during the transfer operation.

As shown in FIG. 3B, during the transfer operation, the control signal TG is brought to the level of the supply voltage VDD, and the control voltage SW is brought to the level VSK. This causes a flow of charge Q from the photodiode to the sensing node SN, as represented by an arrow 310. The voltage level at the sensing node SN thus falls to a level 312, which is higher than the level VSK-$V_{TH}$. Therefore, there is no transfer of charge to the additional node AN. The comparison operation 210 of FIG. 2 will therefore indicate that the voltage level $\Delta V_{SN}$ is lower than the threshold level $V_S$, and thus the pixel value PIX will be determined in operation 212 based on the voltage read during the first read operation.

As with FIG. 3B, in the example of FIG. 3C, the control signal TG is brought to the level of the supply voltage VDD, and the control voltage SW is brought to the level VSK during the transfer operation. This causes a flow of charge Q from the photodiode to the sensing node SN as represented by an arrow 310. However, this time there is more charge, causing the voltage level at the sensing node SN to fall to a level 314 equal to VSK-$V_{TH}$. Charge is thus transferred to the additional node AN, as represented by an arrow 316, and the voltage at the additional node AN thus falls to a level 318. The comparison operation 210 of FIG. 2 will therefore indicate that the voltage level $\Delta V_{SN}$ is higher than the threshold level $V_S$, and thus the pixel value PIX will be determined in operation 214 based on the voltage read during the second read operation.

Figure 3D:
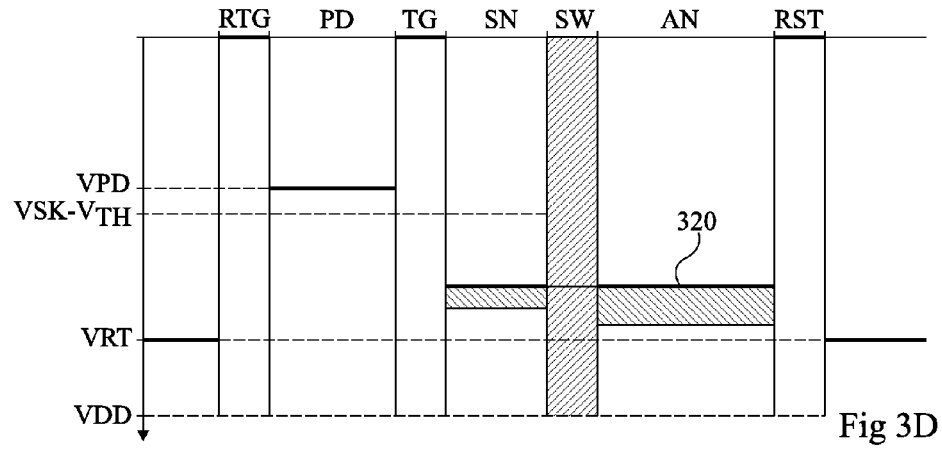
Figure 3E:
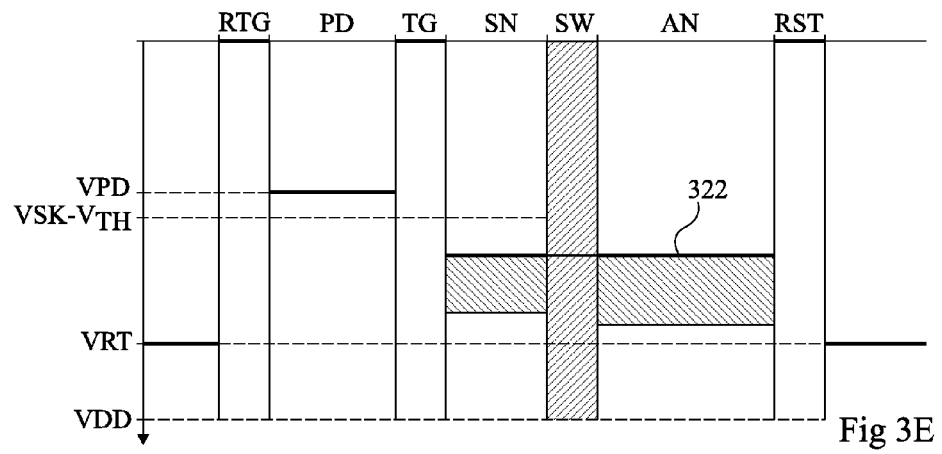

FIGS. 3D and 3E both represent the step of fully activating the transistor 112 just before the second read operation, for example by bringing the signal SW to the voltage level VDD. As represented by different widths of the columns in the example of FIG. 3C, the additional node AN for example has a higher capacitance than the sensing node SN.

FIG. 3D corresponds to the case of FIG. 3B, in which charge was not transferred to the additional node AN during the transfer operation. Thus the charge at the sensing node SN is shared between the nodes SN and AN, and the voltage falls to a level shown by a line 320.

FIG. 3E corresponds to the case of FIG. 3C, in which charge was transferred to the additional node AN during the transfer operation. Thus the voltages at the nodes SN and AN equalize at a level shown by a line 322, higher than the level 320 of FIG. 3D.

Figure 4:
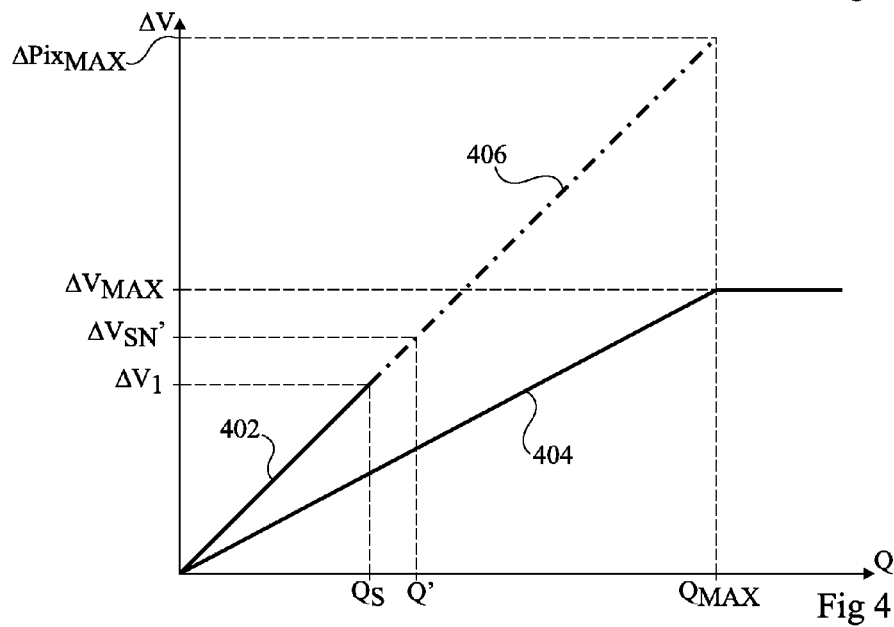
FIG. 4 is a graph representing the relation between accumulated charge and read voltage levels in the pixel of FIG. 1 according to an example embodiment.

FIG. 4 is a graph illustrating an example of the relation between the level of charge Q accumulated by the photodiode during the integration period and the corresponding differential signal $\Delta V$ detected at the sensing node SN during the first or second read operation.

As shown by a solid line 402, up to a level of charge Q' corresponding to a voltage change $\Delta V_{SN}'=V_{RSN}-(VSK-V_{TH})$ at the sensing node SN, no charge will be transferred to the additional node AN and the voltage value read during the first read operation will be proportional to the charge Q. The gradient of the line 402 is for example a function of $1/C_{SN}$, where $C_{SN}$ is the capacitance of the sensing node SN. The pixel value PIX is calculated based on the first read operation only if the charge Q is lower than a level $Q_S$. This level of charge corresponds to a voltage change $\Delta V_1$ read during the first read operation equal to the threshold voltage $V_S$. Thus if the charge accumulated by the photodiode is between 0 and $Q_S$, the pixel value PIX will be between 0 and $\Delta V_1$.

As shown by a solid line 404, the voltage change $\Delta V_{SN+AN}$ detected during the second read operation will be proportional to the charge Q with a gradient which is a function of $1/(C_{SN}+C_{AN}+C_{SW})$, where $C_{SN}$ and $C_{AN}$ are the capacitances of the nodes SN and AN respectively, and $C_{SW}$ is the capacitance associated with the switch 112 when the control signal SW is at the voltage level VDD. The voltage change $\Delta V_{SN+AN}$ detected during the second read operation is for example limited to a level $\Delta V_{MAX}=Q_{MAX}*(C_{SN}+C_{AN}+C_{SW})$, where $Q_{MAX}$ is the maximum level of charge that may be transferred from the photodiode.

A dashed-dotted line 406 in FIG. 4 represents an example of the calculated pixel value PIX for a given level of charge of $Q_S$ or higher, which is calculated by applying a gain G to the value read along the line 404, where the gain G for example corresponds to the gain value G mentioned above and equal to $(C_{SN}+C_{AN}+C_{SW})/C_{SN}$. The gradient of the dashed-dotted line 406 is for example substantially the same as that of the solid line 402, such that there is a substantially linear relation between the accumulated charge and the pixel value PIX.

Figure 5:
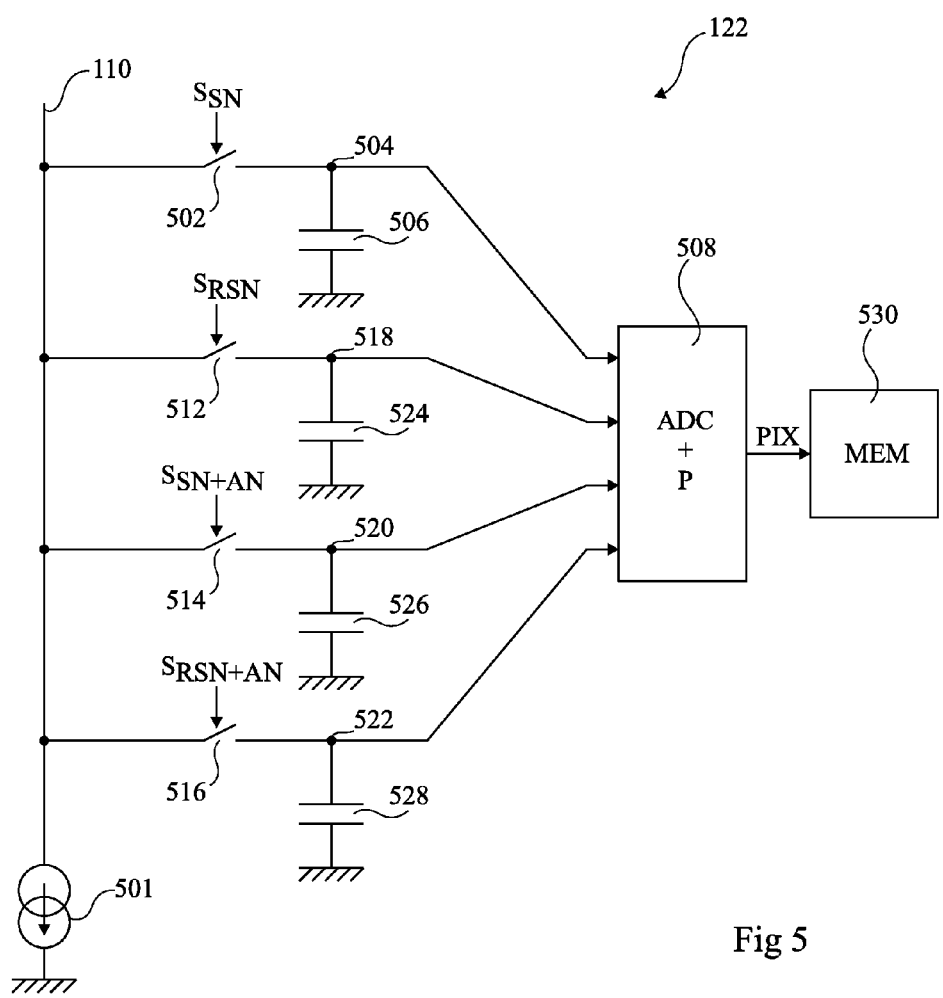
FIG. 5 schematically illustrates an output circuit of the pixel of FIG. 1 in more detail according to an example embodiment.

FIG. 5 schematically illustrates the output block 122 of FIG. 1 in more detail according to an example embodiment. The column line 110 is for example coupled to ground via a current source 501. Furthermore, the column line 110 is coupled, via a switch 502 controlled by a sampling signal $S_{SN}$, to a node 504. The node 504 is in turn coupled to ground via a capacitor 506, and to an analog to digital converter and processing block (ADC+P) 508. Similarly, the column line 110 is for example coupled, via respective switches 512, 514 and 516 controlled by sampling signals $S_{RSN}$, $S_{SN+AN}$ and $S_{RSN+AN}$ respectively, to respective nodes 518, 520 and 522. The nodes 518, 520 and 522 are in turn coupled to ground via capacitors 524, 526 and 528 respectively, and to the block 508. As will be described in more detail below with reference to FIG. 6, the sampling signals $S_{SN}$, $S_{RSN}$, $S_{SN+AN}$ and $S_{RSN+AN}$ are asserted to sample the voltage present at the sensing node SN of a selected pixel of the column, and the read voltages are stored by the capacitors 506, 524, 526 and 528. The block 508 for example converts each of the sampled voltages into a digital value, and the pixel output value PIX is for example generated based on these digital values. The pixel values PIX are for example stored in an image memory (MEM) 530.

It will be apparent to those skilled in the art that in some embodiments the output block 122 of FIG. 1 may comprise further circuits for conditioning the input signals and multiplexing signals before providing them to the block 508.

Figure 6:
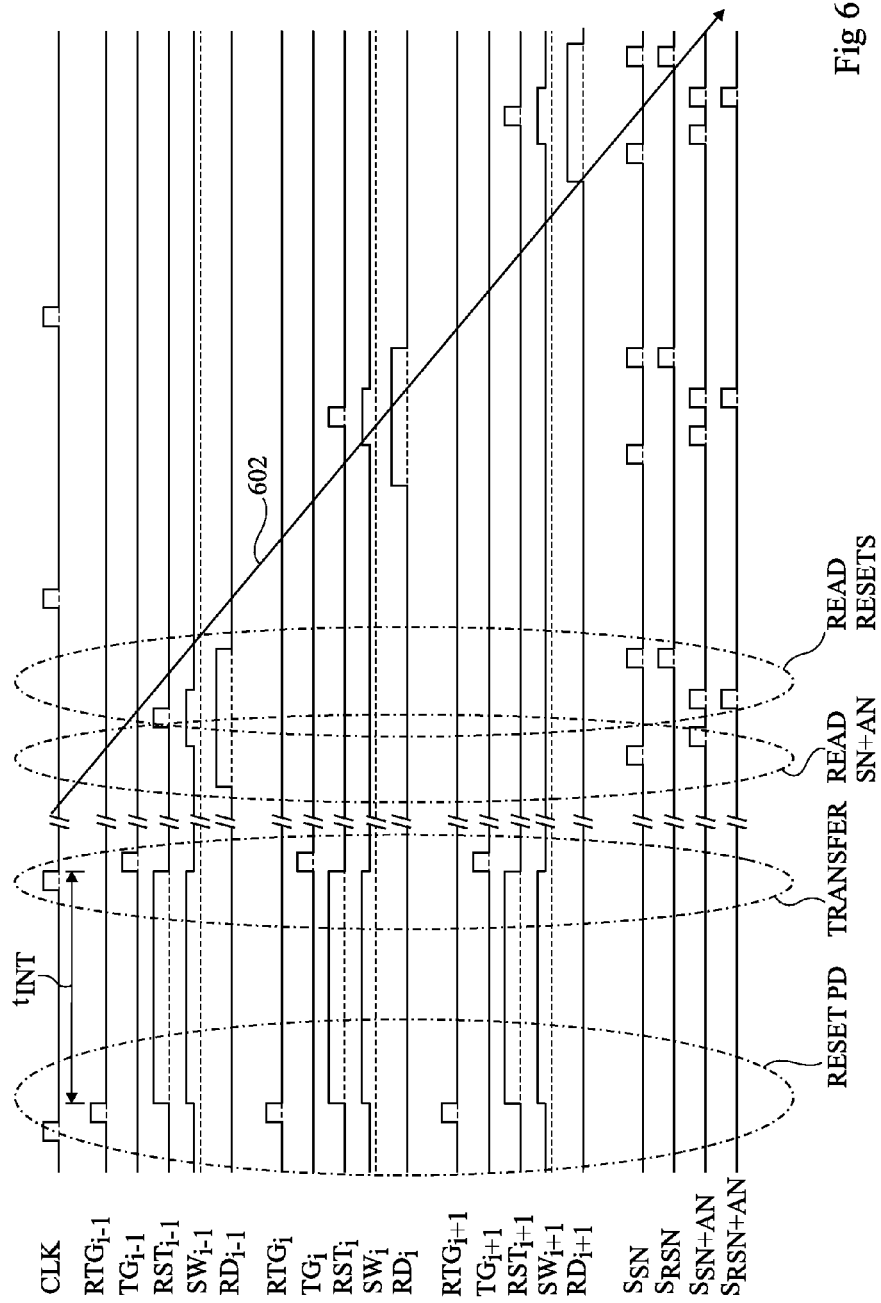
FIG. 6 is a timing diagram illustrating signals in a pixel during reset, transfer and read operations according to an example embodiment.

FIG. 6 is a timing diagram showing examples of the timing signal CLK provided to the control block 120, of the control signals RTG, TG, RST, SW and RD in the pixel of FIG. 1 for an (i−1)th row, for an ith row, and for an (i+1)th row of pixels, and also of the sampling signals $S_{SN}$, $S_{RSN}$, $S_{SN+AN}$ and $S_{RSN+AN}$ that for example control the switches of the output block 122 to sample the voltage on the column line 110.

The example of FIG. 6 assumes that the reset transistor 116 is connected to the additional node AN, rather than to the sensing node SN. It will be apparent to those skilled in the art how the read sequence could be modified in the case that the reset transistor 116 is instead connected to the sensing node SN.

Furthermore, the example of FIG. 6 also assumes a global shutter operation using the transfer gate 118. It will be apparent to those skilled in the art how a rolling shutter operation could be achieved with or without the transfer gate 118. In particular, the implementation of a rolling shutter involves offsetting the integration periods of the pixels of each row with respect to each other such that each row can be read a short time after the end of its corresponding integration period.

Referring to FIG. 6, initially, all of the signals are for example at a ground level, except the signal SW. The signal SW which is for example permanently at the level VSK, except during the second read operation as described above, and except during the integration period as described below.

During the photodiode reset operation (RESET PD), the photodiodes of the whole image sensor are for example reset to initiate a global integration period. Thus each of the signals $RTG_{i-1}$, $RTG_i$ and $RTG_{i+1}$ has a high pulse occurring shortly after a high pulse of the timing signal CLK. The reset signals $RST_{i-1}$, $RST_i$ and $RST_{i+1}$, and the signals $SW_{i-1}$, $SW_i$ and $SW_{i+1}$ are all for example high throughout the integration period.

The integration period for example has a duration $t_{INT}$, and at the end of the integration period, a global shutter operation (TRANSFER) is for example performed to transfer, at the same time in each pixel of the image sensor, the charge from photodiode to the sensing node SN. Thus each of the signals $TG_{i-1}$, $TG_i$ and $TG_{i+1}$ has a high pulse occurring shortly after a further high pulse of the timing signal CLK.

The rows of pixels are for example read one by one in a rolling fashion, as represented by an arrow 602 in FIG. 6. In the example of FIG. 6, the read sequence always involves reading both of the voltages $V_{SN}$ and $V_{SN+AN}$, and both of the reset levels $V_{RSN}$ and $V_{RSN+AN}$. The read sequence of the row i−1 occurs first in FIG. 6, and involves initially asserting the read signal $RD_{i-1}$. The sampling signal $S_{SN}$ is then asserted, and the first read operation is performed, to read the voltage level $V_{SN}$ from the sensing node SN. The signal $SW_{i-1}$ is then brought from the level VSK to the level of the supply voltage VDD, and the second read operation is performed by asserting the sampling signal $S_{SN+AN}$ to read the voltage $V_{SN+AN}$ from the sensing node SN. The reset signal $RST_{i-1}$ is then asserted at the level VDD to reset the voltage at the nodes SN and AN, and the sampling signal $S_{RSN+AN}$ is asserted to cause the voltage level $V_{SN+AN}$ at the nodes SN and AN to be read. The signal $S_{SN+AN}$ is also for example asserted to pre-charge the corresponding sampling capacitor to the reset level. The signal SW is then brought back to the level VSK, and the sampling signal $S_{RSN}$ is asserted to read the reset value $V_{RSN}$ at the sensing node SN. The signal $S_{SN}$ is also for example asserted to pre-charge the corresponding sampling capacitor to the reset level. The read sequences of the ith and (i+1)th rows are for example identical.

While in the example of FIG. 6 the control signal SW remains at the level of VSK except during the integration and read operation, in alternative embodiments it could be brought to a lower level such as the ground level most of the time, except during the transfer and read operations. An advantage of bringing the signal SW to a lower voltage level is that the voltage at the sensing node SN will be better conserved.

An advantage of embodiments described herein is that a pixel of an image sensor is capable of achieving both high dynamic range and high sensitivity in a relatively simple fashion and without significantly increasing the size or energy consumption of the pixel. Indeed, by providing an additional node coupled to the sensing node via a transistor controlled by an intermediate voltage during the transfer phase, the gain at the sensing node is variable depending on the amount of charge accumulated by the photodiode during the integration period.

Having thus described at least one illustrative embodiment, various alterations, modifications and improvements will readily occur to those skilled in the art.

For example, while the described embodiments include a transfer gate 118 providing a simple global shutter implementation, it will be apparent to those skilled in the art that in alternative embodiments this transfer gate could be omitted.

Furthermore, it will be apparent to those skilled in the art that rather than being at 0 V, the ground voltage can be considered as a further supply voltage that could be at any level, such as a negative level.

Furthermore, it will be apparent to those skilled in the art that, in any of the embodiments described herein, some or all of the NMOS transistors could be replaced by PMOS transistors and vice versa. Additionally or alternatively, some transistors such as the transistor 112 could be replaced by an NMOS/PMOS switch. Furthermore, while transistors based on MOS technology are described throughout, in alternative embodiments other transistor technologies could be used, such as bipolar technology.

Furthermore, it will be apparent to those skilled in the art that the various features described in relation to the various embodiments could be combined, in alternative embodiments, in any combination.

The invention claimed is:

1. An image sensor comprising:
   at least one pixel having a photodiode; a sensing node coupled to the photodiode via a transfer gate; and a further node coupled to the sensing node via a first transistor; and
   a control circuit adapted:
   to apply, during a reset operation of the voltage levels at the sensing node and further node, a first voltage level to a control node of the first transistor; and
   to apply, during a transfer operation of charge from the photodiode to the sensing node, a second voltage level to the control node of the first transistor, the second voltage level being lower than the first voltage level and higher than a ground voltage of the pixel; and to perform, after the transfer operation, a first read operation to generate a first value based on the voltage at the sensing node and a second read operation to generate a second value based on the voltage at the sensing node while applying the first voltage level to the control node of the first transistor.

2. The image sensor of claim 1, wherein the second voltage level is lower than VRT+$V_{TH}$ and higher than VPD+$V_{TH}$, where VRT is a reset voltage level applied to the sensing node and further node during the reset operation, VPD is a pinned voltage level of the photodiode and $V_{TH}$ is a threshold voltage level of the first transistor.

3. The image sensor of claim 1, wherein during the transfer operation the control circuit is further adapted to apply the first voltage level to a control node of the transfer gate.

4. The image sensor of claim 1, wherein the control circuit is further adapted:

to compare the first value with a threshold level.

5. The image sensor of claim 4, further comprising an output block coupled to the sensing node via a read-out circuit of the pixel, wherein based on the comparison of the first value with the threshold level, the output block is arranged to either:

generate a pixel value based on the first value; or
generate a pixel value based on the second value.

6. The image sensor of claim 1, wherein the at least one pixel further comprises a reset transistor having one of its main current nodes connected to the further node and its other main current node coupled to a supply voltage rail.

7. The image sensor of claim 1, wherein the at least one pixel further comprises a reset transistor having one of its main current nodes connected to the sensing node and its other main current node coupled to a supply voltage rail.

8. The image sensor of claim 1, wherein the at least one pixel further comprises a second transfer gate coupled between the photodiode and a supply voltage rail.

9. The image sensor of claim 8, wherein the control circuit is adapted to control said second transfer gate of the at least one pixel to reset the photodiode to perform a global reset of the image sensor.

10. A method of operating at least one pixel of an image sensor, the at least one pixel having: a photodiode; a sensing node coupled to the photodiode via a transfer gate; and a further node coupled to the sensing node via a first transistor, the method comprising:

applying, by a control circuit during a reset operation of the voltage levels at the sensing node and further node, a first voltage level to a control node of the first transistor;

applying, by the control circuit during a transfer operation of charge from the photodiode to the sensing node, a second voltage level to the control node of the first transistor, the second voltage level being lower than the first voltage level and higher than a ground voltage of the pixel; and performing, after the transfer operation, a first read operation to generate a first value based on the voltage at the sensing node and a second read operation to generate a second value based on the voltage at the sensing node while applying the first voltage level to the control node of the first transistor.

11. The method of claim 10, wherein the second voltage level is lower than VRT+$V_{TH}$ and higher than VPD+$V_{TH}$, where VRT is a reset voltage level applied to the sensing node and further node during the reset operation, VPD is the pinned voltage level of the photodiode and $V_{TH}$ is a threshold level of the first transistor.

12. The method of claim 10, further comprising applying, during the transfer operation, the first voltage level to the transfer gate.

13. The method of claim 10, further comprising:
comparing the first value with a threshold level.

14. The method of claim 13, further comprising generating, based on the comparison of the first value with the threshold level, either:

a pixel value based on the first value; or
a pixel value based on the second value.

15. An image sensor comprising:

at least one pixel having a photodiode; a sensing node coupled to the photodiode via a transfer gate; and a further node coupled to the sensing node via a first transistor; and a control circuit adapted:

to apply, during a reset operation of the voltage levels at the sensing node and further node, a first voltage level to a control node of the first transistor; and to apply, during a transfer operation of charge from the photodiode to the sensing node, a second voltage level to the control node of the first transistor, the second voltage level being lower than the first voltage level and higher than a ground voltage of the pixel; wherein the second voltage level is lower than VRT+$V_{TH}$ and higher than VPD+$V_{TH}$, where VRT is a reset voltage level applied to the sensing node and further node during the reset operation, VPD is a pinned voltage level of the photodiode and $V_{TH}$ is a threshold voltage level of the first transistor.

16. A method of operating at least one pixel of an image sensor, the at least one pixel having: a photodiode; a sensing node coupled to the photodiode via a transfer gate; and a further node coupled to the sensing node via a first transistor, the method comprising:

applying, by a control circuit during a reset operation of the voltage levels at the sensing node and further node, a first voltage level to a control node of the first transistor; and applying, by the control circuit during a transfer operation of charge from the photodiode to the sensing node, a second voltage level to the control node of the first transistor, the second voltage level being lower than the first voltage level and higher than a ground voltage of the pixel; wherein the second voltage level is lower than VRT+$V_{TH}$ and higher than VPD+$V_{TH}$, where VRT is a reset voltage level applied to the sensing node and further node during the reset operation, VPD is the pinned voltage level of the photodiode and $V_{TH}$ is a threshold level of the first transistor.

\* \* \* \* \*

UNITED STATES PATENT AND TRADEMARK OFFICE
CERTIFICATE OF CORRECTION

PATENT NO. : 9,736,411 B2
APPLICATION NO. : 14/918195
DATED : August 15, 2017
INVENTOR(S) : Marie Guillon, Yvon Cazaux and Josep Segura Puchades It is certified that error appears in the above-identified patent and that said Letters Patent is hereby corrected as shown below:

On the Title Page

Item (73) Assignee, should read as follows:
Commissariat à l'Energie Atomique et aux Energies Alternatives
Paris, France Signed and Sealed this
Twelfth Day of February, 2019

Andrei Iancu
*Director of the United States Patent and Trademark Office*